(12) United States Patent
Chiu et al.

(10) Patent No.: US 8,377,330 B2
(45) Date of Patent: Feb. 19, 2013

(54) LIQUID CRYSTAL DISPLAY STRUCTURE

(75) Inventors: Chih-Ho Chiu, Hsin-Chu (TW);
Te-Sheng Chen, Hsin-Chu (TW);
Chung-Ching Hsieh, Hsin-Chu (TW);
Chia-Hsuan Pai, Hsin-Chu (TW);
Cheng-Wei Huang, Hsin-Chu (TW);
Sugiura Norio, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 400 days.

(21) Appl. No.: 12/560,635

(22) Filed: Sep. 16, 2009

(65) Prior Publication Data

US 2010/0097543 A1    Apr. 22, 2010

(30) Foreign Application Priority Data

Oct. 22, 2008    (TW) ............................... 97140419 A

(51) Int. Cl.
*C09K 19/00*    (2006.01)
*C09K 19/06*    (2006.01)
*C09K 19/32*    (2006.01)
*C09K 19/52*    (2006.01)
*G02F 1/1333*    (2006.01)

(52) U.S. Cl. .................... 252/299.01; 252/299.6; 349/1; 349/56; 349/86; 349/182; 345/87; 428/1.1; 428/1.3

(58) Field of Classification Search ............. 252/299.01, 252/299.6; 428/1.1, 1.3; 349/1, 56, 86, 182; 345/87

See application file for complete search history.

(56) References Cited

U.S. PATENT DOCUMENTS 7,465,479 B2 * 12/2008 Bremer et al. ................. 428/1.1
2006/0256244 A1 11/2006 Jak et al.

FOREIGN PATENT DOCUMENTS

| TW | 331980 | 5/1998 |
| TW | M258239 | 3/2005 |
| TW | 200919039 | 5/2009 |
| WO | 2004079437 A1 | 9/2004 |

OTHER PUBLICATIONS

Taiwan Office Action dated Aug. 14, 2012.
English translation of abstract and pertinent parts of TW 331980.

* cited by examiner

*Primary Examiner* — Geraldina Visconti
(74) *Attorney, Agent, or Firm* — McClure, Qualey & Rodack, LLP

(57) ABSTRACT

A liquid crystal display structure is provided. The liquid crystal display structure includes a liquid crystal panel and a backlight module. The liquid crystal panel has a liquid crystal layer including photo-polymerizable monomers. The backlight module has a light emitting unit for emitting an output light. A difference between the smallest value of the spectrum interval of the output light and the largest value of the absorption spectrum interval of the photo-polymerizable monomer in the liquid crystal layer is larger than or equal to 40 nm.

10 Claims, 4 Drawing Sheets

LIQUID CRYSTAL DISPLAY STRUCTURE

BACKGROUND OF THE INVENTION

1. Field of the Invention

This invention generally relates to a liquid crystal display structure. More particularly, this invention relates to a liquid crystal display structure used in a polymer stabilized alignment (PSA) liquid crystal display (LCD) to improve the image sticking effect.

2. Description of the Prior Art

Using the polymer stabilized alignment (PSA) technique in liquid crystal displays has the advantages of decreasing light leakage, improving contrast, reducing cost, and increasing transmittance. The PSA technique refers to mixing cross-linkable monomers into liquid crystals and applying voltage to liquid crystal cells to align the liquid crystals as well as the monomers mixed in the liquid crystals. Then, the monomers are cured by ultraviolet (UV) light to become cross-linked and have a particular pre-tilt angle so as to control the alignment ability of the liquid crystal and accordingly, the function of bumps can be replaced. Therefore, the dark state light leakage induced by bumps in multi-domain vertical alignment mode (MVA mode) can be reduced and the contrast can be improved.

Using UV light to cross-link the monomers mixed in the liquid crystals is time-consuming. Hence, various factors including insufficient curing time could result in uncross-linked monomers in the liquid crystals. Theses monomers may be cured by the light emitted from the backlight such as the cold cathode fluorescent lamp (CCFL) to become cross-linked and have a different pre-tilt angle resulting in the image sticking effect. Therefore, the LCD using the PSA technique is still improvable. At present, an attempt to reduce the image sticking effect is to fully cross-link the monomers mixed in the liquid crystals during the LCD manufacturing process. To achieve this goal, the percentage of the monomers mixed in the liquid crystals is decreased to as less as possible. However, this approach leads to a complicated process and substantially increases the manufacturing time.

SUMMARY OF THE INVENTION

It is an object of the present invention to provide a liquid crystal display structure for improving the image sticking effect, simplifying the manufacturing process, and reducing the manufacturing time.

The liquid crystal display structure of the present invention includes a liquid crystal panel and a backlight module. The liquid crystal panel has a liquid crystal layer including a plurality of photo-polymerizable monomers. The backlight module has a light emitting unit for emitting an output light, wherein a difference between the smallest value of the spectrum interval of the output light and the largest value of the absorption spectrum interval of the photo-polymerizable monomers in the liquid crystal layer is larger than or equal to 40 nm.

In an embodiment of the present invention, the light emitting unit includes a light source and a filter film. The filter film is disposed on a light emitting side of the light source. An original light is emitted from the light source and then passes through the filter film to become the output light. The difference between the smallest value of the spectrum interval of the output light and the largest value of the absorption spectrum interval of the photo-polymerizable monomers in the liquid crystal layer is larger than or equal to 40 nm. The light source includes a cold cathode fluorescent lamp or a light-emitting diode module. The filter film includes a polymer and an absorbent.

The weight percentage of the photo-polymerizable monomers in the liquid crystal layer is between 0.1% and 10.0%. The largest value of the absorption spectrum interval of the photo-polymerizable monomers in the liquid crystal layer is smaller than or equal to 340 nm. The smallest value of the spectrum interval of the output light is larger than or equal to 380 nm.

DETAILED DESCRIPTION OF THE PREFERRED EMBODIMENT

Figure 1:
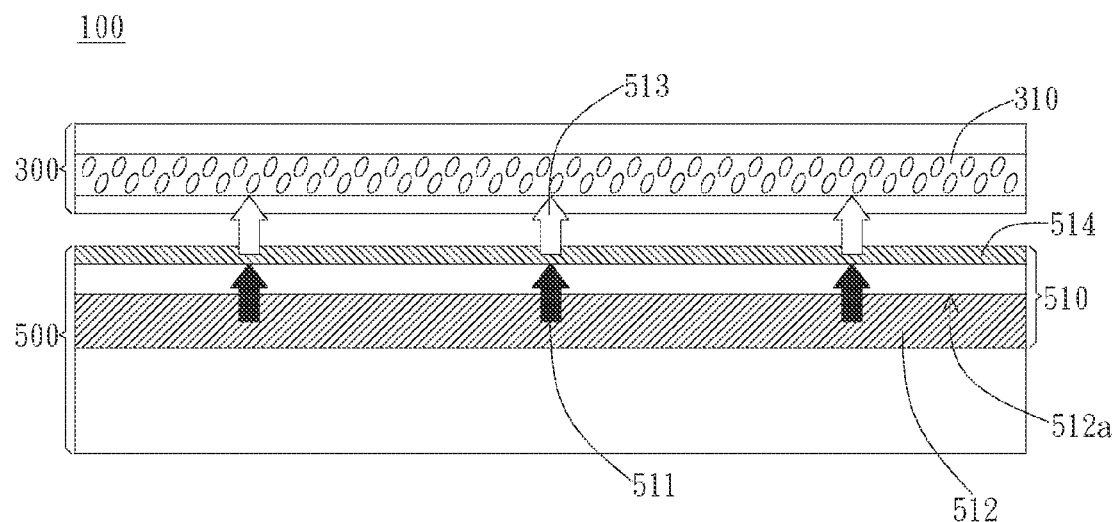
FIG. 1 is a schematic view of an embodiment of the present invention.

The present invention provides a liquid crystal display structure. As shown in FIG. 1, in a preferred embodiment, the liquid crystal display structure 100 of the present invention includes a liquid crystal panel 300 and a backlight module 500. The liquid crystal panel 300 has a liquid crystal layer 310, wherein the liquid crystal layer 310 has a plurality of photo-polymerizable monomers. In the preferred embodiment, the weight percentage of the photo-polymerizable monomers in the liquid crystal layer is between 0.1% and 10.0%.

The photo-polymerizable monomers in the liquid crystal layer are selected from a group consisting of formula 1, formula 2, formula 3, formula 4, and formula 5:

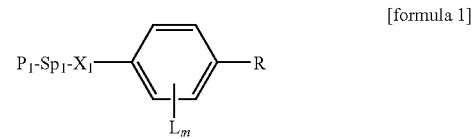

[formula 1]

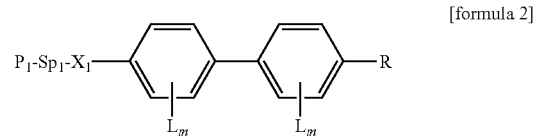

[formula 2]

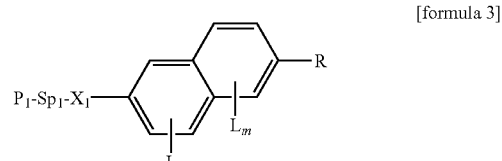

[formula 3]

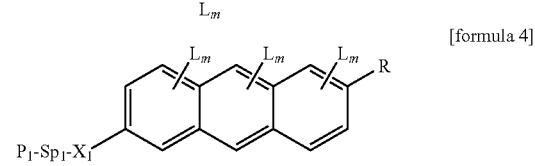

[formula 4]

[formula 5]

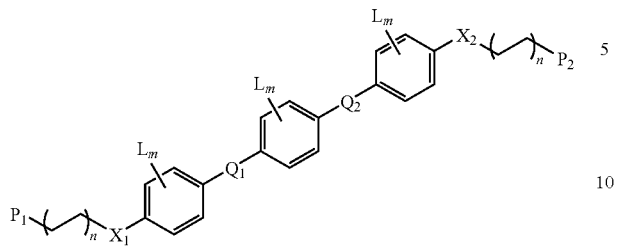

wherein n≧1, and R can be the same or different and selected from —H, —F, —Cl, —CN, —SCN, —SF$_5$H, —NO$_2$, an alkyl group having a straight-chain or a branch-chain, or —X$_2$—Sp$_2$-P$_2$. When R is an alkyl group having a straight-chain or a branch-chain, R is preferably an alkyl group having one to twelve carbon atoms, wherein one or two nonadjacent —CH$_2$— can be substituted with —O—, —S—, —CH=CH—, —CO—, —OCO—, —COO—, —S—CO—, —CO—S—, or alkyne, and oxygen atom and sulfur atom are not directly bonded with each other. X$_1$ and X$_2$ can be independently selected from —O—, —S—, —OCH$_2$—, —CO—, —COO—, —OCO—, —CO—N$^O$R—, —N$^O$R—CO—, —OCH$_2$—, —SH$_2$—, —CH$_2$S—, —CH=CH—COO—, —OOC—CH=CH—, or a single bond. Sp$_1$ and Sp$_2$ can be independently selected from a spacer group or a single group. Lm (m≧1) is selected from —F, —Cl, —CN, an alkyl group having one to seven carbon atoms, an alkylcarbonyl group, an alkoxycarbonyl group, or an alkylcarbonyloxy group, wherein at least one hydrogen atom of the alkyl group, the alkylcarbonyl group, the alkoxycarbonyl group, and an alkylcarbonyloxy group can be substituted with a fluorine atom or a chlorine atom. Q$_1$ and Q$_2$ can be independently selected from —O—, —S—, —CO—, —COO—, —OCO—, —OCH$_2$—, —SCH$_2$—, —CH$_2$S—, —CH=CH—COO—, —OOC—CH=CH—, —CF$_2$O—, —OCF$_2$—, —CF$_2$S—, —SCF$_2$—, —C$_2$H$_4$—, —CF$_2$—CH$_2$—, —CH$_2$—CF$_2$—, —CF$_2$—CF$_2$—, —CH=CH—, —CF=CF—, —C≡O— or a single bond. P$_1$ and P$_2$ can be a polymerizable group independently selected from a group consisting of formula 6, formula 7, formula 8, formula 9, and formula 10:

[formula 6]

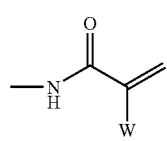

wherein W can be selected from —H, —CH$_3$, —F, —CF$_3$, or -Ph;

[formula 7]

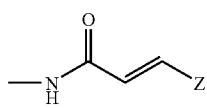

wherein Z can be selected from —H, —CH$_3$, —F, —CF$_3$, or -Ph;

[formula 8]

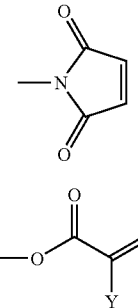

[formula 9]

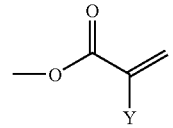

wherein Y can be selected from —F, —CF$_3$, or -Ph;

[formula 10]

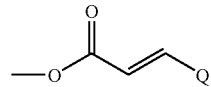

wherein Q can be selected from —CH$_3$, —F, —CF$_3$, or -Ph.

The backlight module 500 includes a light emitting unit 510 for emitting an output light 513. A difference between the smallest value of the spectrum interval of the output light 513 and the largest value of the absorption spectrum interval of the photo-polymerizable monomers in the liquid crystal layer is preferably larger than or equal to 40 nm. In the preferred embodiment shown in FIG. 1, the light emitting unit 510 includes a light source 512 and a filter film 514. The filter film 514 is disposed on a light emitting side 512a of the light source 512. The light 511 is originally emitted from the light source 512 and then passes through the filter film 514 to become the output light 513 so that the difference between the smallest value of the spectrum interval of the output light 513 and the largest value of the absorption spectrum interval of the photo-polymerizable monomers in the liquid crystal layer 310 is larger than or equal to 40 nm. Since the spectrum interval of the output light 513 and the absorption spectrum interval of the photo-polymerizable monomers are not overlapped and have a certain gap therebetween, the probability that the uncross-linked monomers are cured to be cross-linked by the output light 513 causing the image sticking effect can be reduced.

Figure 2:
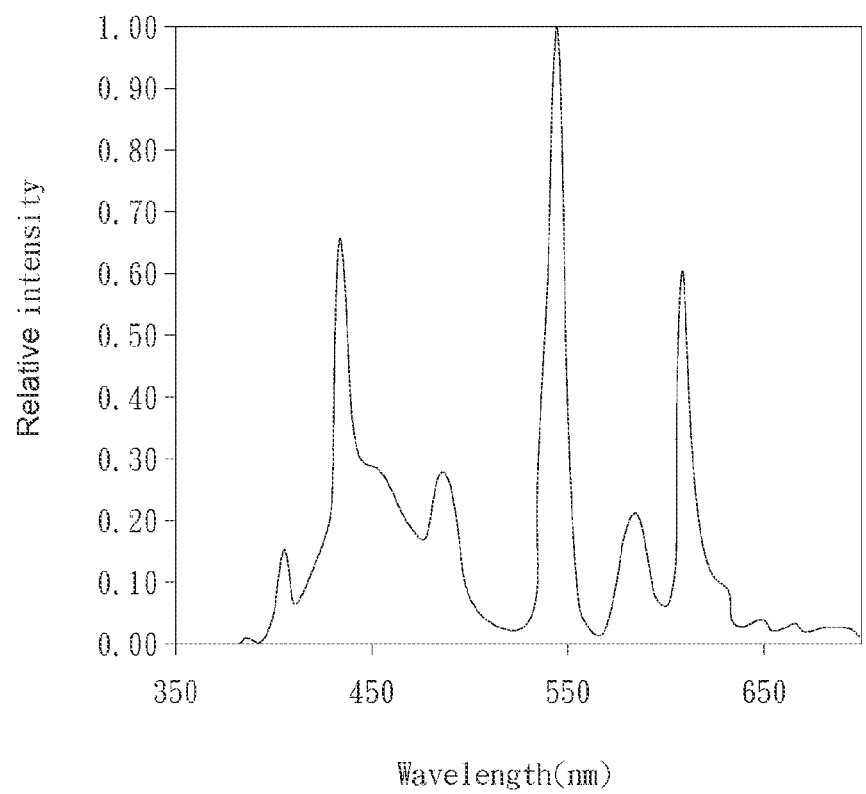
FIG. 2 is an absorption spectrum of a cold cathode fluorescent lamp in one embodiment of the present invention.
Figure 3:
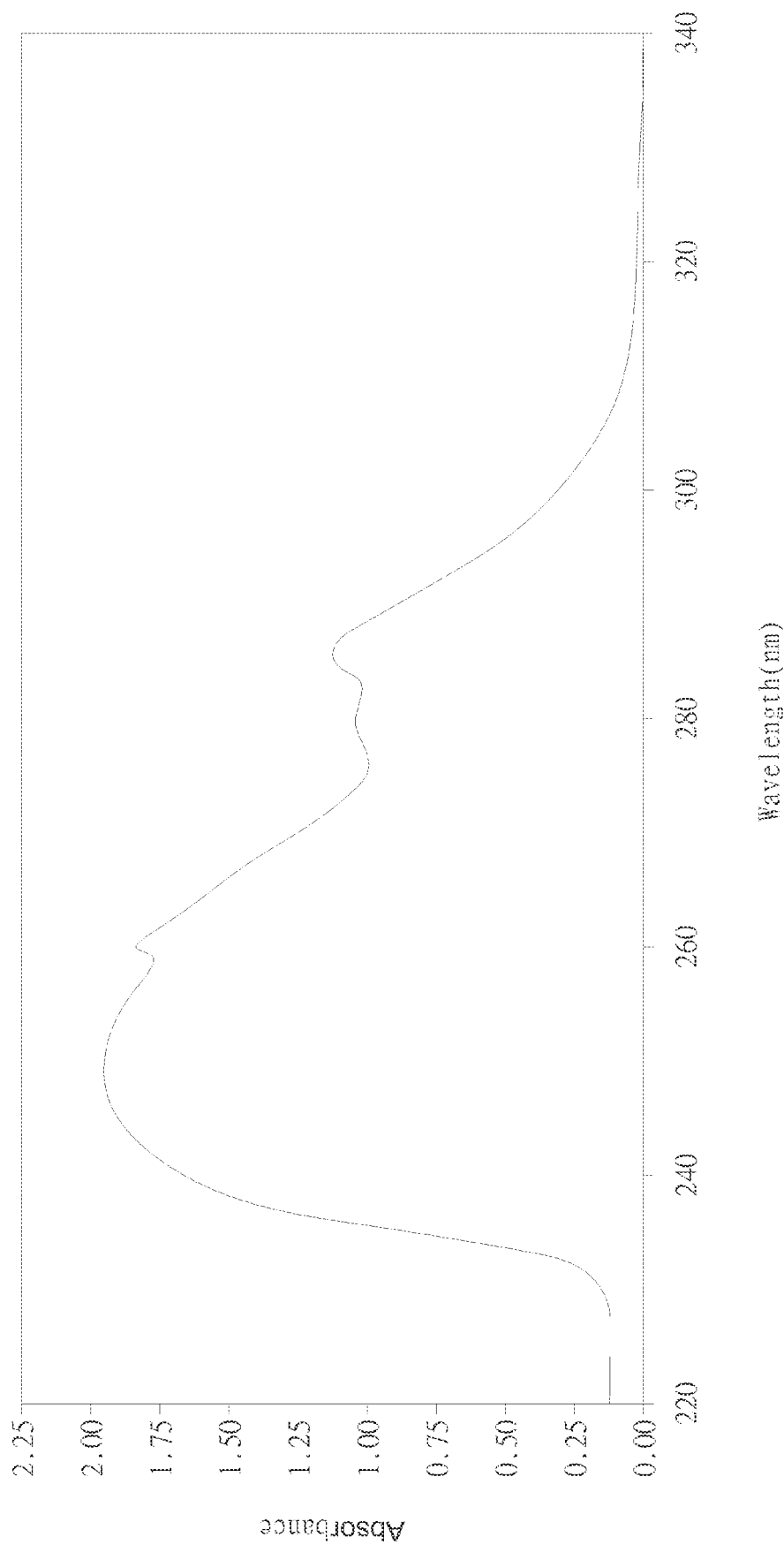
FIG. 3 is an absorption spectrum of a photo-polymerizable monomer in one embodiment of the present invention.

More particularly, in the preferred embodiment, the light source 512 is a cold cathode fluorescent lamp, but is not limited thereto. In other embodiments, however, the light source 512 can be a light-emitting diode module, such as a UV light-emitting diode and a phosphor mixture. The filter film 514 includes a polymer and an absorbent. The polymer is used for forming a film. The absorbent is used for absorbing a light of specific absorption spectrum interval. FIG. 2 and FIG. 3 are respectively the absorption spectrums of the cold cathode fluorescent lamp and the uncross-linked monomers, wherein the photo-polymerizable monomers are compounds of the above mentioned formula 2. In the preferred embodiment, the absorption spectrum interval of the cold cathode fluorescent lamp is approximately larger than 360 nm and the absorption spectrum interval of the photo-polymerizable monomer is smaller than or equal to 340 nm, i.e. the two absorption spectrum intervals are not overlapped. However, the absorption spectrum interval of the photo-polymerizable monomer may shift as the solution environment changes. Therefore, the absorption spectrum interval of the photo-polymerizable monomer may overlap the absorption spectrum interval of the cold cathode fluorescent lamp during operation of the panel.

Figure 4:
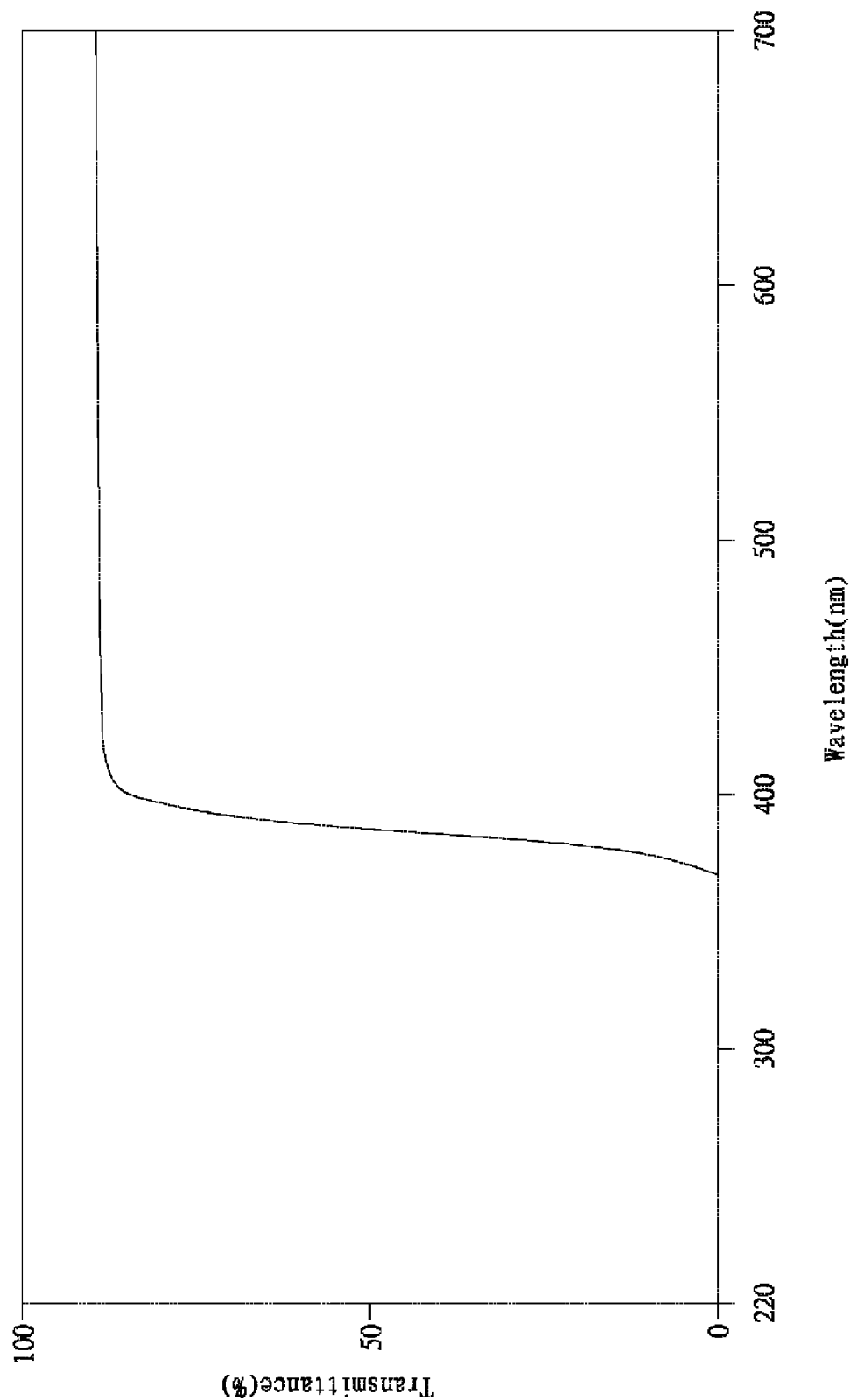
FIG. 4 is a transmittance spectrum of a filter film in one embodiment of the present invention.

A transmittance diagram of a filter film is shown in FIG. 4. In the preferred embodiment, the filter film can filter out the light having a wavelength smaller than 380 nm to convert the original light emitted from the cold cathode fluorescent lamp into the output light having a wavelength approximately larger than or equal to 380 nm after passing through the filter film. In other words, a part of the light emitted from the cold cathode fluorescent lamp which can be absorbed by the photo-polymerizable monomer to initiate a cross-link reaction is filtered out by the filter film. The difference between the smallest value of the spectrum interval of the output light 513 and the largest value of the absorption spectrum interval of the photo-polymerizable monomers in the liquid crystal layer 310 is preferably larger than or equal to 40 nm. Therefore, the probability that the uncross-linked monomers are cured to be cross-linked by the light emitted from the cold cathode fluorescent lamp causing the image sticking effect can be reduced.

The polymer is preferably polyethylene terephthalate (PTFE), polyethylene-2,6-naphthalate (PEN), cellulose triacetate (TAO), polypropylene (PP), polyethylene (PE), polycarbonate (PC), polymethyl methacrylate (PMMA), polyvinyl chloride (PVC), or norbornene resins. The absorbent is preferably benzotriazole, salicylate, benzophenone, aminobutadiene, or the derivatives of the above compounds.

Figure 5:
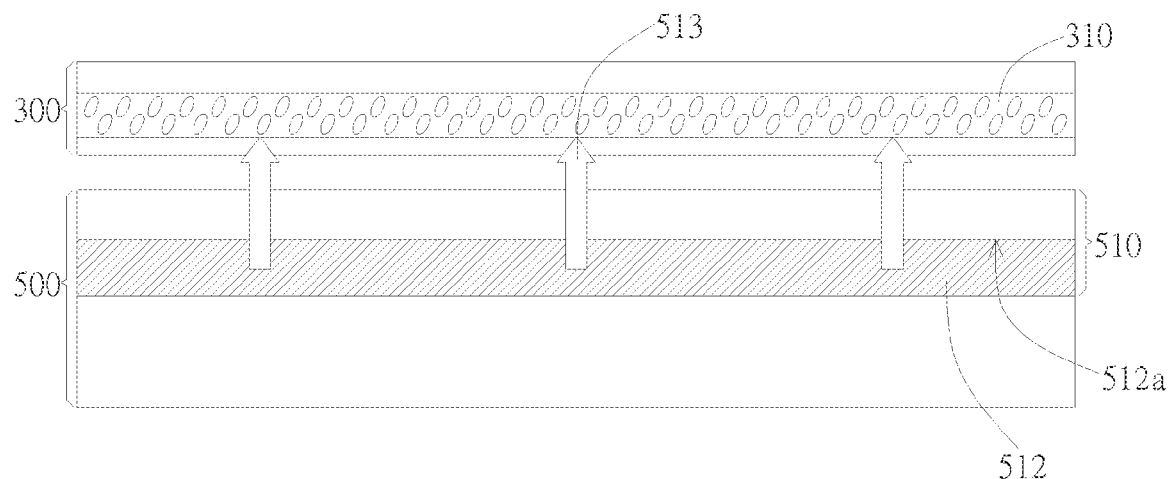
FIG. 5 is a schematic view of another embodiment of the present invention.

In other embodiments, as shown in FIG. 5, the light emitting unit 510 can be a light-emitting diode module without the filter film 514. The absorption spectrum interval of the output light 513 is approximately larger than or equal to 470 nm and the absorption spectrum interval of the photo-polymerizable monomer is smaller than or equal to 340 nm. Since the two absorption spectrum intervals are not overlapped, the image sticking effect caused by the monomers cured to be cross-linked by the light emitted from the cold cathode fluorescent lamp can be improved. The light-emitting diode module is not limited to a mixed light-emitting diode module having a red light, a green light, and a blue light. Any light-emitting diode module capable of emitting an output light having a spectrum interval in such a way that the difference between the smallest value of the spectrum interval of the output light and the largest value of the absorption spectrum interval of the photo-polymerizable monomers in the liquid crystal layer is larger than or equal to 40 nm will be appropriate. For example, the light-emitting diode module can include a UV light-emitting diode and a phosphor mixture, wherein the phosphor mixture includes a red phosphor, a green phosphor, and a blue phosphor. In still another embodiment, the light-emitting diode module can include a blue light-emitting diode and a yellow phosphor.

For the liquid crystal display in each of the embodiments, the spectrum interval of the output light and the absorption spectrum interval of the photo-polymerizable monomers are spaced apart from each other by at least 40 nm. Hence, the tolerance concentration of the monomers mixed in the liquid crystals is increased, the process is simplified, and the manufacturing time is decreased.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A liquid crystal display structure, comprising:
a liquid crystal panel having a liquid crystal layer, wherein the liquid crystal layer has a plurality of photo-polymerizable monomers; and
a backlight module having a light emitting unit for emitting an output light, wherein a difference between the smallest value of a spectrum interval of the output light and the largest value of an absorption spectrum interval of the photo-polymerizable monomers in the liquid crystal layer is larger than or equal to 40 nm.

2. The liquid crystal display structure of claim 1, wherein the light emitting unit includes:
a light source; and
a filter film disposed on the light source,
wherein an original light is emitted from the light source and then passes through the filter film to become the output light, and
wherein the difference between the smallest value of the spectrum interval of the output light and the largest value of the absorption spectrum interval of the photo-polymerizable monomers in the liquid crystal layer is larger than or equal to 40 nm.

3. The liquid crystal display structure of claim 2, wherein the light source includes a cold cathode fluorescent lamp or a light-emitting diode module.

4. The liquid crystal display structure of claim 2, wherein the filter film includes a polymer and an absorbent.

5. The liquid crystal display structure of claim 1, wherein the light source includes a light-emitting diode module.

6. The liquid crystal display structure of claim 1, wherein a weight percentage of the photo-polymerizable monomers in the liquid crystal layer is between 0.1% and 10.0%.

7. The liquid crystal display structure of claim 1, wherein the largest value of the absorption spectrum interval of the photo-polymerizable monomers in the liquid crystal layer is smaller than or equal to 340 nm.

8. The liquid crystal display structure of claim 1, wherein the smallest value of the spectrum interval of the output light is larger than or equal to 380 nm.

9. The liquid crystal display structure of claim 1, wherein the photo-polymerizable monomers in the liquid crystal layer are selected from a group consisting of formula 1, formula 2, formula 3, formula 4, and formula 5:

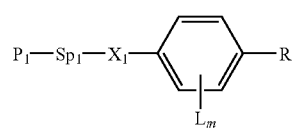

[formula 1]

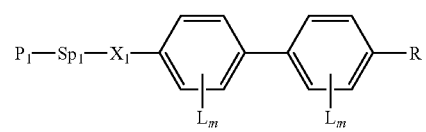

[formula 2]

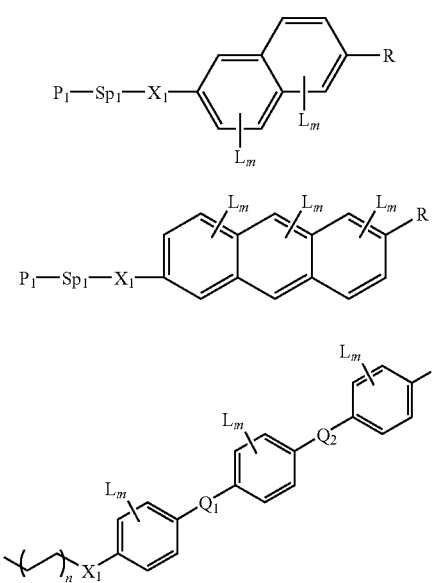

wherein R is selected from —H, —F, —Cl, —CN, —SCN, —SF₅H, —NO₂, an alkyl group having a straight-chain or a branch-chain, or —X₂—Sp₂-P₂;

wherein X₁ and X₂ are independently selected from —O—, —S—, —OCH₂—, —CO—, —COO—, —OCO—, —CO—N⁰R—, —N⁰R—CO—, —OCH₂—, —SH₂—, —CH₂S—, —CH═CH—COO—, —OOC—CH═CH—, or a single bond;

Sp₁ and Sp₂ are independently selected from a spacer group or a single group;

Lm (m≧1) is selected from —F, —Cl, —CN, an alkyl group having one to seven carbon atoms, an alkylcarbonyl group, an alkoxycarbonyl group, or an alkylcarbonyloxy group, and at least one hydrogen atom of the alkyl group, the alkylcarbonyl group, the alkoxycarbonyl group, or an alkylcarbonyloxy group can be substituted with a fluorine atom or a chlorine atom;

n≧1;

Q₁ and Q₂ are independently selected from —O—, —S—, —CO—, —COO—, —OCO—, —OCH₂—, —SCH₂—, —CH₂S—, —CH═CH—COO—, —OOC—CH═CH—, —CF₂O—, —OCF₂—, —CF₂S—, —SCF₂—, —C₂H₄—, —CF₂—CH₂—, —CH₂—CF₂—, —CF₂—CF₂—, —CH═CH—, —CF═CF—, —C≡C—, or a single bond; and P₁ and P₂ are a polymerizable group independently selected from formula 6, formula 7, formula 8, formula 9, or formula 10:

[formula 6]

wherein W is selected from —H, —CH₃, —F, —CF₃, or -Ph;

[formula 7]

wherein Z is selected from —H, —CH₃, —F, —CF₃, or -Ph;

[formula 8]

[formula 9]

wherein Y is selected from —F, —CF₃, or -Ph;

[formula 10]

wherein Q is selected from —CH₃, —F, —CF₃, or -Ph.

10. The liquid crystal display structure of claim 9, wherein R is an alkyl group having one to twelve carbon atoms, wherein one or two nonadjacent —CH₂— can be substituted with —O—, —S—, —CH═CH—, —CO—, —OCO—, —COO—, —S—CO—, —CO—S—, or alkyne, and the oxygen atom and sulfur atom are not directly bonded with each other.

* * * * *